United States Patent [19]

Felder

[11] Patent Number: 5,766,536
[45] Date of Patent: Jun. 16, 1998

[54] METHOD FOR MANUFACTURING LOCKABLE THERMOPLASTIC CONTAINERS

[75] Inventor: Scott J. Felder, McHenry, Ill.

[73] Assignee: Tenneco Packaging, Evanston, Ill.

[21] Appl. No.: 694,638

[22] Filed: Aug. 7, 1996

[51] Int. Cl.$^6$ .......................... B29C 51/10; B29C 51/34
[52] U.S. Cl. .................... 264/297.1; 264/322; 264/334; 264/553; 425/438; 425/443; 425/DIG. 58
[58] Field of Search ........................... 264/544, 547, 264/322, 334, 297.1, 553; 425/388, DIG. 58, 441, 438, 443

[56] References Cited

U.S. PATENT DOCUMENTS

| | | | |
|---|---|---|---|
| 3,126,582 | 3/1964 | Scott | 18/19 |
| 3,284,553 | 11/1966 | Edwards | 264/89 |
| 3,337,664 | 8/1967 | Lyons | 264/89 |
| 3,530,537 | 9/1970 | Walker | 18/19 |
| 3,551,954 | 1/1971 | Knowles | 18/19 |
| 3,703,255 | 11/1972 | Wade | 229/1.5 B |
| 3,905,240 | 9/1975 | Igarashi et al. | 73/432 SD |
| 3,995,763 | 12/1976 | Ayres et al. | 220/74 |
| 4,286,766 | 9/1981 | von Holdt | 249/144 |
| 4,383,819 | 5/1983 | Letica | 425/577 |
| 4,495,135 | 1/1985 | White | 264/553 |
| 4,502,660 | 3/1985 | Luther et al. | 249/144 |
| 4,609,339 | 9/1986 | Padovani | 425/383 |
| 4,627,810 | 12/1986 | Von Holdt | 425/577 |
| 4,822,553 | 4/1989 | Marshall | 264/292 |
| 4,847,034 | 7/1989 | Araki et al. | 264/553 |
| 4,861,257 | 8/1989 | Siotani | 425/438 |
| 5,046,659 | 9/1991 | Warburton | 229/2.5 |
| 5,281,385 | 1/1994 | Julian | 425/438 |
| 5,407,344 | 4/1995 | Rombalski, Jr. et al. | 425/DIG. 58 |
| 5,536,161 | 7/1996 | Smith | 425/DIG. 58 |

OTHER PUBLICATIONS

Plastics Div. Mobil Chemical, Cheesecake Wedge Hinged Lid Container (C18–9303), "Product Drawing", Dwg. No. FDD–35283, Nov. 15, 1994, 1 Sheet.

Plastics Div. Mobil Chemical, Cheesecake Wedge Hinged Lid Container (C18–9303), "Assembly Drawing", Dwg. No. FDD–35286, Nov. 17, 1994, 2 Sheets.

Plastic Div. Mobil Chemical, Cheesecake Wedge Hinged Lid Container (C18–9393), "Base Insert", Dwg. No. FDD–35203, Sep. 13, 1994, 1 Sheet.

Plastics Div. Mobil Chemical, Cheesecake Wedge Hinged Lid Container (C18–9303), "Base Latch Holder", Dwg. No. FDD–35294, Dec. 16, 1994, 1 Sheet.

Plastics Div. Mobil Chemical, Cheesecake Wedge Hinged Lid Container (C18–9303), "Base Latch", Dwg. No. FDD–35295, Dec. 18, 1994, 1 Sheet.

Plastics Div. Mobil Chemical, Cheesecake Wedge Hinged Lid Container (C18–9303), "Base Cavity", Dwg. No. FDD–35299, Nov. 14, 1994, 2 Sheets.

(List continued on next page.)

*Primary Examiner*—Jan H. Silbaugh
*Assistant Examiner*—Mark Eashoo
*Attorney, Agent, or Firm*—Arnold, White & Durkee

[57] ABSTRACT

An apparatus and method for forming thermoplastic containers having a male locking member. The apparatus includes a cavity defining a shape of the container, a stripper movable in a longitudinal direction relative to said cavity, and a retractable lock adjacent to an edge of the cavity. The retractable lock is movable in a transverse direction relative to the cavity between a retracted position and an unretracted position and movable in a longitudinal direction between a first position and a second position. The containers are formed through a process in which the apparatus is sequentially placed in a ready mode, lift mode, disengage mode, and back to the ready mode. In the ready mode, the retractable lock is placed in the unretracted position and first position in order to receive a sheet of plastic material and form a locking member thereon. In the lift mode, the retractable lock is moved in a longitudinal direction from the first position to the second position in order to lift the container from the cavity. In the disengage mode, the retractable lock is moved in a transverse direction from the unretracted position to the retracted position in order to disengage itself from the locking member.

8 Claims, 4 Drawing Sheets

OTHER PUBLICATIONS

Plastics Div. Mobil Chemical, 9 " Pie Wedge Hinged Lid Container, "Product Drawing", Dwg. No. FDD–40205, Oct. 13, 1992, & Jun. 12, 1992, 2 Sheets.

Plastic Div. Mobil Chemical, 9 " Pie Wedge Hinged Lid COntainer, "Assembly Drawing", Dwg. No. FDD–40208, Jun. 12, 1992, 2 Shewets.

Plastics Div. Mobil Chemical, 9" Pie Wedge Hinged Lid Container, "Cavity–(Base)", Dwg. No. FDD–40210, Nov. 25, 1992 & Jun. 28, 1992, 2 Sheets.

Plastics Div. Mobil Chemical, 9" Pie Wedge Hinged Lid Container , Dwg. No. FDD–40216, Aug. 11, 1992, 1 Sheet.

Plastics Div. Mobil Chemical, 9 " Pie Wedge Hinged Lid Container, Dwg. No. FDD–40217, Jul. 26, 1995, 1 Sheet.

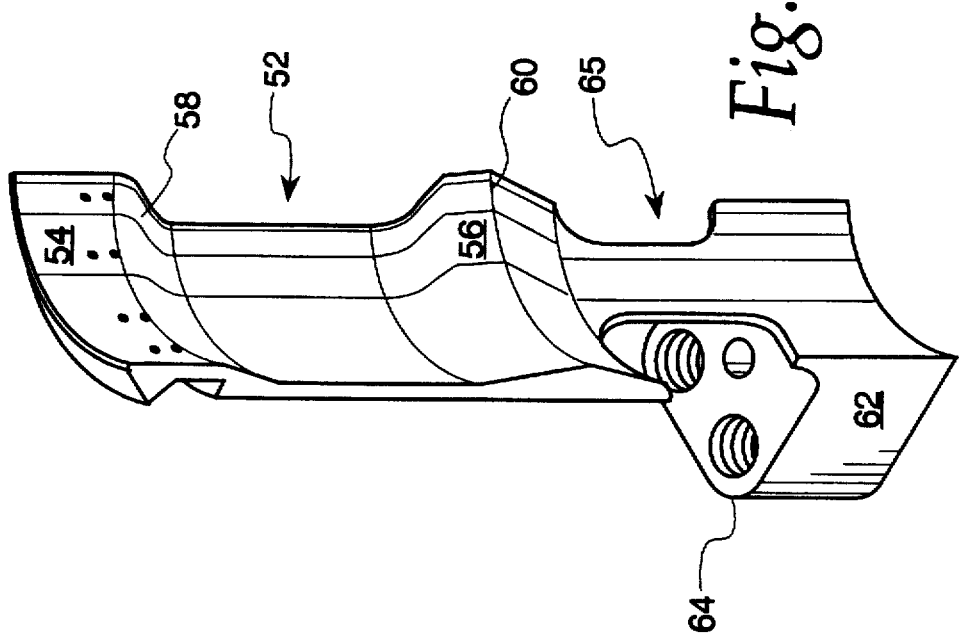
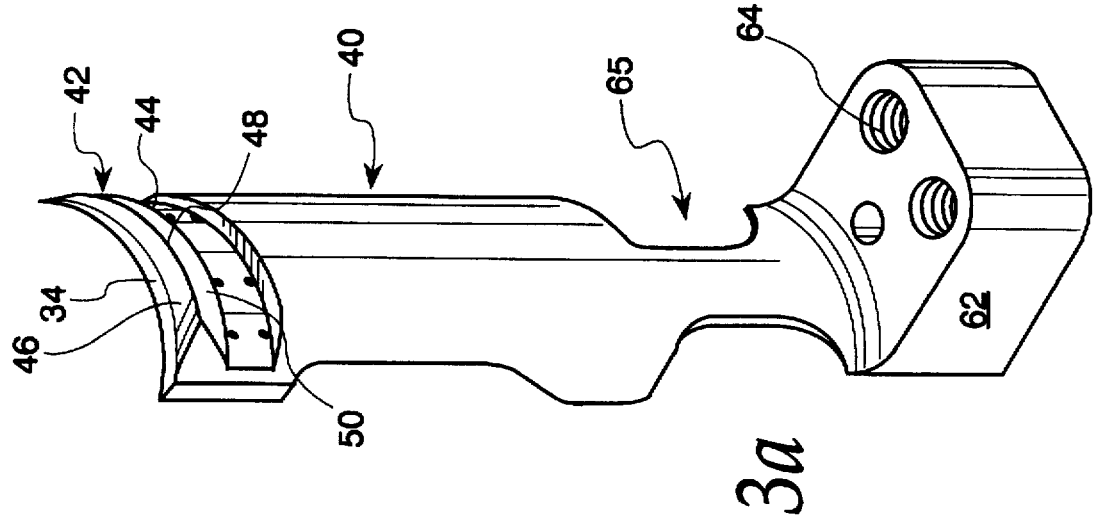

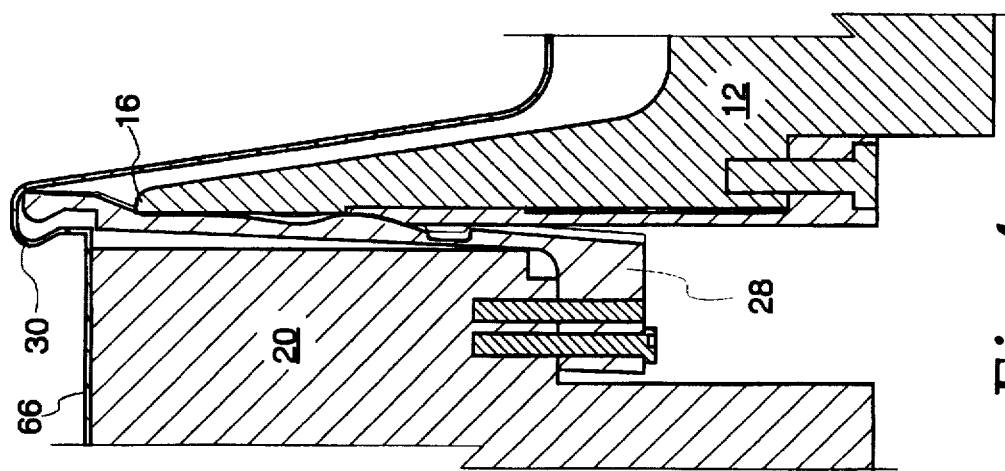
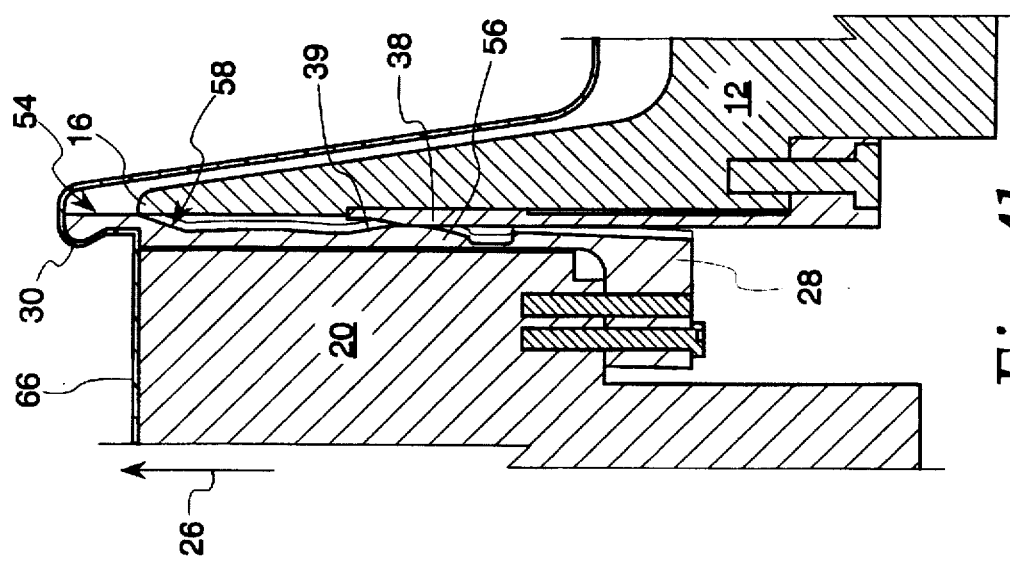
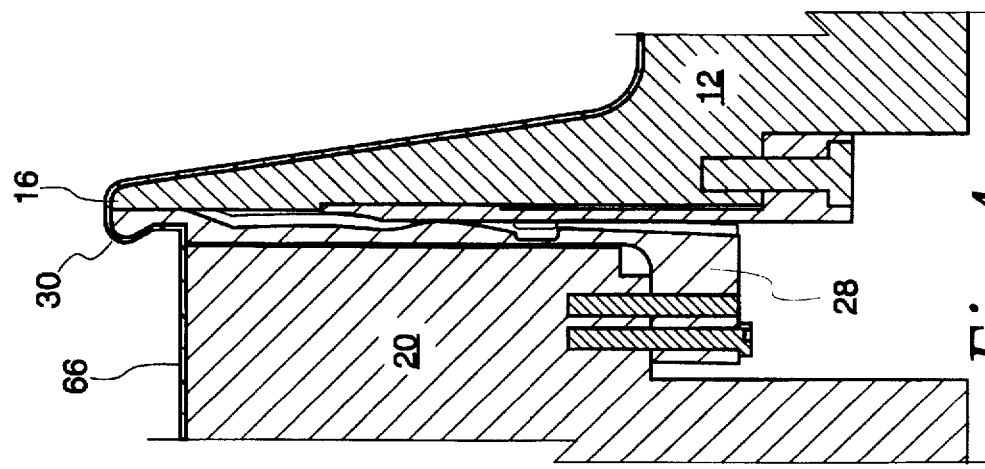

METHOD FOR MANUFACTURING LOCKABLE THERMOPLASTIC CONTAINERS

FIELD OF THE INVENTION

The present invention relates generally to the field of manufacturing thermoplastic containers which are adapted to be enclosed with an interlocking lid. More particularly, the present invention relates to a method and apparatus for forming a male locking member on a thermoplastic container, involving placement of a sheet of heated plastic over a retractable lock which forms an impression of the locking member and which thereafter may be retracted to disengage from the impression.

BACKGROUND OF THE INVENTION

It is well known that thermoplastic containers may be economically formed from a sheet of plastic material by the steps of (1) advancing a sheet of plastic material through an oven, thereby softening the material to a malleable state; (2) advancing the plastic sheet over a mold having the desired geometry of the container; (3) drawing the softened plastic sheet into the contours of the mold by means of a vacuum; (4) cooling the plastic sheet in the impression of the mold; (5) releasing the molded plastic containers from the mold; and (6) advancing the container to a trim station to trim individual containers from the continuous roll. These steps are used to manufacture virtually all modern thermoplastic containers. Alternative container designs may be accommodated by changing the shape of the mold.

Depending on the purpose of the container, it may be desirable to provide the container with an interlocking lid. Such containers generally interlock by means of male locking members on the container interlocking with a corresponding indented surface or aperture on the lid. The male locking members are generally formed by providing the mold with one or more male projections which are defined by an outward extension from the mold at its top edge and an undercut or inward extension back toward the mold a designated distance below the top edge of the mold. Thus, the length of the male locking members in a transverse direction is defined by the distance between the undercut and the furthest outward surface of the male projection, while the length of the male locking member in a longitudinal direction is defined by the distance between the undercut and the top edge of the male projection.

A significant disadvantage associated with the prior art method of forming male locking members is that the hardened plastic locking member becomes difficult to remove from the projection over which it was formed. This problem occurs because, upon removal of the container from the mold, the undercut portion of the locking member encounters and becomes blocked by the farthest outward surface of the male projection extending from the mold. Obviously, this problem becomes more exaggerated in proportion to the degree that the undercut extends inwardly from the farthest outward surface. The greater the degree of undercut, the more difficult it is to remove the plastic container from the mold. Thus, known prior art thermoplastic containers are limited to using locking members having a relatively small degree of undercut so that they may be easily removed from the mold. As a result of using locking members with a small degree of undercut, prior art containers cannot be relied upon to lock and stay locked during shipping and handling.

Accordingly, the present invention is directed to providing an apparatus and method for forming a locking member on a container with a larger undercut that overcomes or at least reduces the effects of one or more of the problems set forth above.

SUMMARY OF THE INVENTION

In accordance with one aspect of the present invention, there is provided an apparatus for forming a thermoplastic container comprising a cavity defining a shape of the container, a stripper movable in a longitudinal direction relative to said cavity, and a retractable lock adjacent to an edge of the cavity. The retractable lock is movable in a transverse direction relative to said cavity between a retracted position and an unretracted position and movable in a longitudinal direction between a first position and a second position. A ready mode is defined in which the retractable lock is in the unretracted position and first position in order to receive a sheet of plastic material and form a locking member thereon. The apparatus may also be placed in a lift mode in which the retractable lock is moved in a longitudinal direction from the first position to the second position in order to lift the container from the cavity. Further, a disengage mode is defined in which the retractable lock is moved in a transverse direction from the unretracted position to the retracted position in order to disengage itself from the locking member.

In accordance with another aspect of the present invention, there is provided a retractable lock for forming a male locking member on a thermoplastic container. The outer surface of the retractable lock includes a male projection and an undercut. The male projection includes an upper contour extending downwardly and outwardly from a top edge of the retractable lock toward a farthest outward surface of the retractable lock, and a lower contour extending downwardly and inwardly from the farthest outward surface of the retractable lock toward the undercut. The inner surface of the retractable lock includes a linear region, a control surface and a relief angle. The linear region is adapted to abut against a top side of a cavity in a first longitudinal position for forming a locking member on a container and move in a longitudinal direction toward a second longitudinal position away from said cavity. The control surface is adapted to rub against a wear pad having a cam when the retractable lock is moved in a longitudinal direction and serve as a cam follower imparting transverse motion to the retractable lock. The relief angle is adapted to define the amount of transverse motion associated with moving the retractable lock in the longitudinal direction.

In accordance with still another aspect of the present invention, there is provided a method of forming a thermoplastic container comprising the steps of heating a sheet of plastic material, advancing the sheet over a cavity defining a shape of a container, a retractable lock being provided adjacent to the upper edge of the cavity which is movable in both a transverse direction and longitudinal direction, drawing the sheet onto the cavity when the retractable lock is in an unretracted position and a first longitudinal position, cooling the sheet to form an impression defining the container and a locking member formed over the retractable lock, lifting the impression from the cavity by moving the retractable lock to a second longitudinal position, and disengaging the locking member from the retractable lock by moving the retractable lock to a retracted position.

BRIEF DESCRIPTION OF THE DRAWINGS

The foregoing and other advantages of the invention will become apparent upon reading the following detailed description and upon reference to the drawings in which:

FIGS. 3a and 3b are perspective views of the retractable lock portion of the apparatus shown in FIG. 1; and FIGS. 4a, 4b and 4c are cross-sectional views of a corner portion of the apparatus in FIG. 1 showing a method of forming a thermoplastic container according to one embodiment of the invention.

Figure 1:
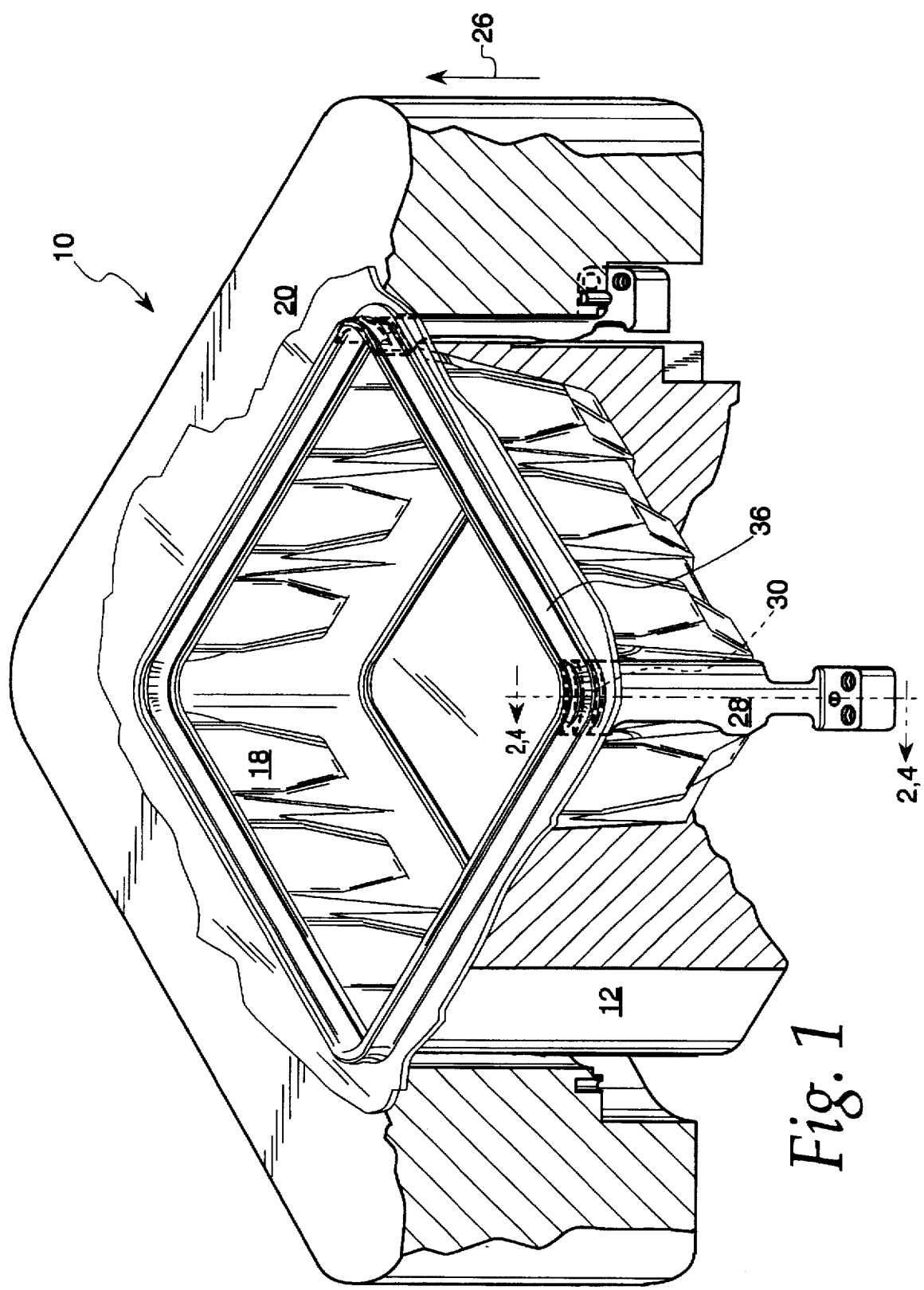
FIG. 1 is an isometric view of an apparatus for forming a thermoplastic container according to one embodiment of the invention, with portions broken away to show internal structure.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Figure 2:
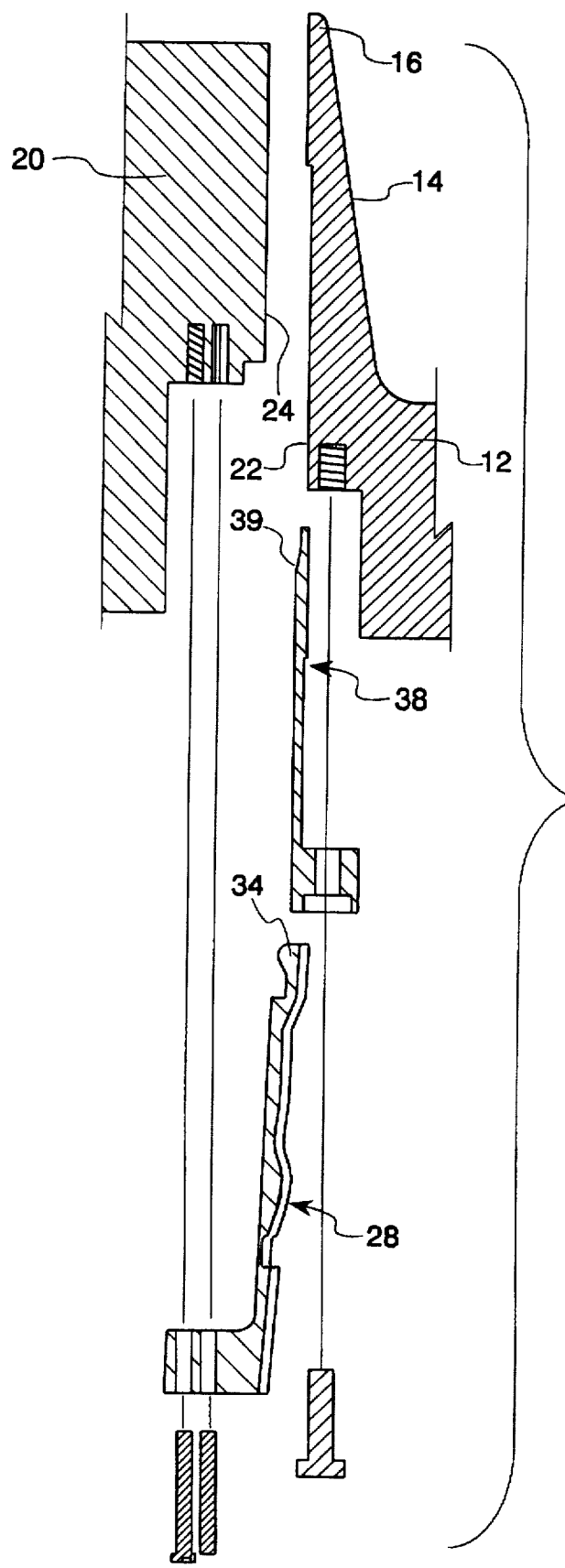
FIG. 2 is an exploded cross-sectional view of a corner portion of the apparatus shown in FIG. 1.

Turning now to the drawings and referring initially to FIGS. 1 and 2, an apparatus for forming a base and/or lid of a thermoplastic container according to one embodiment of the invention is illustrated and generally designated in FIG. 1 by a reference numeral 10. As used herein, the term "container" refers to either or both of the base and/or lid of a container. The apparatus 10 includes a cavity 12 which is made of aluminum or any other suitable material known in the art. The cavity 12 has an inner surface 14 and a top edge surface 16 which defines the shape of the container. A sheet of heated thermoplastic material, such as oriented polystyrene (OPS), polypropylene or any other suitable thermoforming material is disposed over the inner surface 14 and top edge surface 16 of the cavity 12, drawn into the contours of the cavity 12 and cooled to form an impression 18 of the container. As can be appreciated by those skilled in the art, the cavity 12 may also be inverted and the sheet of material disposed under and drawn into the cavity 12 to form the impression 18 of the container. Nevertheless, the foregoing description will describe the sheet of plastic material as being placed over rather than under the cavity 12.

The apparatus 10 further includes a stripper 20 which is made of aluminum or any suitable material known in the art and which consists of a planar surface having a large opening at its center. As can be more clearly seen in FIG. 2, the cavity 12 is encompassed within the opening of the stripper 20 such that the outer walls 22 of the cavity 12 are adjacent to the inner walls 24 of the stripper 20. After the plastic material is cooled to form the impression 18 of the container, the stripper 20 facilitates removal of the impression 18 from the cavity 12 by moving in a longitudinal direction 26 relative to the cavity 12 and lifting the impression 18 partially out of the cavity 12.

The apparatus 10 further includes one or more retractable locks 28 disposed between the outer walls 22 of the cavity 12 and the inner walls 24 of the stripper 20 for forming male locking members 30 on the container. The retractable lock 28 is made of hardened steel or any other suitable material known in the art, and is movable in both a longitudinal direction and transverse direction relative to the cavity 12. In the embodiment depicted in FIG. 1, the retractable lock 28 is fixedly attached to the stripper 20 and moves in a longitudinal direction 26 as the stripper 20 is moved in a longitudinal direction 26, but it should be appreciated that the retractable lock 28 may potentially be attached to surfaces other than the stripper 20 and may be moved in a longitudinal direction independently of the stripper 20.

When the apparatus 10 is in a "ready" mode adapted to receive a sheet of heated plastic material, the retractable lock 28 abuts against the outer wall 22 of the cavity 12 so that its top edge 34 is level with the top edge surface 16 of the cavity 12. The plastic material thereafter is placed over the two abutting surfaces to form a male locking member 30 on an upper edge 36 of the impression 18. After the plastic is cooled, the apparatus 10 enters a "lift" mode in which the stripper 20 and retractable lock 28 are moved in the longitudinal direction 26 to lift the impression 18 from the cavity 12. The apparatus 10 then enters a "disengage" mode in which the retractable lock 28 is retracted to disengage from the male locking member 30. The apparatus 10 then reenters the "ready" mode in order to receive additional sheets of plastic material and form impressions of additional containers. The thermoplastic material may be fed toward the cavity in a continuous roll and the above modes cycled through several times per minute to allow mass production of the containers.

Referring again to FIG. 2, the apparatus 10 also includes a wear pad 38, made of hardened steel or any other suitable material, which is disposed on the outer walls 22 of the cavity 12 and is rubbed against by the retractable lock 28 in response to movement of the stripper 20 in a longitudinal direction. Projecting outwardly from the wear pad 38 toward the retractable lock 28 is a convex outer surface, or cam 39. As will be described in greater detail hereinafter, longitudinal movement of the retractable lock 28 over the cam 39 imparts transverse motion to the retractable lock 28, enabling it to be disengaged from the locking member 30.

Turning now to FIGS. 3a and 3b, the retractable lock portion 28 of the apparatus 10 will be described in greater detail. FIG. 3a depicts an outer surface 40 of the retractable lock 28 intended to face away from the outer walls 22 of the cavity 12. The outer surface 40 has a top portion including a male projection 42 and an undercut 44 adapted to form an impression of a male locking member on a container. The male projection 42 has an upper contour 46 extending downwardly and outwardly from a top edge 34 of the retractable lock 28 toward a farthest outward surface 48, and a lower contour 50 extending downwardly and inwardly from the farthest outward surface 48 toward the undercut 44. Because the invention herein enables the retractable lock 28 to be easily disengaged from the male locking member formed over it, the male projection 42 and associated undercut 44 may be aggressively designed to provide a more secure lock than that available in the prior art. As depicted in FIG. 3a, the outer surface 40 of the retractable lock 28 is gently curved in order to form a locking member on a curved "corner" of a container, but of course the outer surface 40 of the retractable lock 28 may be flat or curved in a different manner to accommodate placement of locking members on different parts or types of containers.

Referring now to FIG. 3b, the inner surface 52 of the retractable lock 28 will be described in greater detail. The inner surface 52 is intended to abut against the wear pad 38 and outer walls 22 of the cavity 12, and includes a linear region 54, a control surface 56 and a relief angle 58. Similar to the outer surface 40 described above, the inner surface 52 is depicted in FIG. 3b as being gently curved, but those skilled in the art will appreciate that the inner surface 52 may alternatively be flat or curved in a different manner depending on the type of container and desired placement of the locking member. The linear region 54 of the inner surface 52 is adapted to abut against the top portion of the outer walls 22 of the cavity 12 when the apparatus is in the "ready" mode. The control surface 56 is adapted to rub against the wear pad 38 when the retractable lock 28 is moved in a longitudinal direction. The control surface 56 is adapted to encounter a cam on the wear pad 38 and impart transverse motion to the retractable lock 28 when the control surface 56 is moved in a longitudinal direction over the cam. The degree of transverse motion imparted to the retractable lock 28 is determined by the relief angle 58 located under the linear region 54 of the retractable lock.

In the embodiment shown in FIGS. 3a and 3b, the retractable lock 28 also includes a bottom portion 62 that projects outwardly to form a connecting surface with threaded holes 64 for connecting the retractable lock 28 to the stripper 20. However, as can be appreciated by those skilled in the art, the retractable lock 28 may alternatively be connected to the cavity or another suitable surface associated with the apparatus. A narrow resilient portion 65 extends upwardly from the bottom portion 62. The resilient portion 65 is biased so that the natural position of the retractable lock 28 is in a retracted position toward the cavity 12 and apart from the stripper 20, but is resilient enough to enable the retractable lock 28 to be bent toward the stripper 20 when in the ready mode and spring back toward its natural position away from the stripper 20 when in the disengage mode despite being fixedly attached to the stripper 20.

Turning now to FIGS. 4a, 4b and 4c, the modes of operation of the apparatus 10 depicted in FIG. 1 will hereinafter be described in detail. FIG. 4a portrays the position of the apparatus 10 when in the ready mode. In the ready mode, the retractable lock 28 is in an unretracted position and in a first longitudinal position adjacent to the top edge 16 of the cavity 12 in order to receive a sheet of plastic material 66 and form a male locking member 30 thereon. Projecting outwardly from the wear pad 38 toward the control surface 56 of the retractable lock 28 is a convex outer surface, or cam 39, which in the ready mode contacts a portion upward of the control surface 56. Although the retractable lock 28 is normally biased in a transverse direction away from the stripper 20, the contact between the wear pad 38 and the control surface 56 when in the ready mode causes the retractable lock 28 to be pushed toward the stripper 20 and sandwiched between the outer walls of the cavity 12 and the inner walls of the stripper 20.

FIG. 4b portrays the position of the apparatus 10 when in the lift mode. In the lift mode, the stripper 20 and attached retractable lock 28 begin to move in a longitudinal direction 26 away from the cavity 12 toward a second longitudinal position. When in the lift mode, the cam 39 on the wear pad 38 begins to contact the middle portion of the control surface 56, causing the force which pushes the retractable lock 28 toward the stripper 20 to be gradually released. As shown in FIG. 4b, however, the retractable lock 28 does not yet move toward its naturally biased position away from the stripper 20 because the linear region 54 on the inner surface of the retractable lock 28 is still in contact with the top edge surface 16 of the cavity 12. The retractable lock 28 begins to move in a transverse direction away from the stripper 20 when the stripper 20 is moved still further in a longitudinal direction, causing the top edge surface 16 of the cavity 12 to contact the relief angle 58 rather than the linear region 54 of the retractable lock 28. As the stripper 20 is moved still further in the longitudinal direction, the top edge surface 16 of the cavity 12 contacts lower and lower parts of the relief angle 58 and the retractable lock 28 is thereby permitted to move farther toward its naturally biased position away from the stripper 20.

Finally, FIG. 4c depicts the position of the apparatus 10 when in the disengage mode. In the disengage mode, the stripper 20 is moved still farther in the longitudinal direction so as to reach the second longitudinal position, causing the retractable lock 28 to be fully moved toward its retracted position and disengaged from the male locking member 30. From this position, the container is removed from the cavity 12 by moving the entire apparatus 10 in a still further longitudinal position away from the cavity 12. The apparatus 10 is then returned back to ready mode and is able to receive another sheet of thermoplastic material 66. The entire process of moving from ready mode to lift mode to disengage mode, releasing the container and returning to ready mode may be repeated several times per minute in order to produce a large amount of containers.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of forming a thermoplastic container comprising the steps of:

heating a sheet of plastic material into a malleable physical state;

advancing said sheet over a cavity defined by a mold when said sheet is in said malleable physical state, said cavity defining a shape of said container said mold having an outer edge with a retractable lock adjacent thereto, said retractable lock having a top portion including a male projection and an undercut facing outwardly from said outer edge of said mold, said retractable lock being movable in a transverse direction relative to said cavity between a retracted position and an unretracted position and movable in a longitudinal direction relative to said cavity between a first position and a second position;

drawing said sheet into said cavity and around said top portion of said retractable lock when said retractable lock is in said unretracted position and said first position and when said sheet is in said malleable physical state;

cooling said sheet from said malleable physical state into a hardened physical state to form an impression defining said container and defining a locking member formed around said top portion of said retractable lock, said locking member facing outwardly from an outer edge of said container, said impression being formed when said sheet is formed in said cavity and around said top portion of said retractable lock and when said retractable lock is in said unretracted position and said first position;

lifting said impression from said cavity by moving said retractable lock from said first position to said second position; and disengaging said locking member from said retractable lock by moving said retractable lock inwardly toward said cavity from said unretracted position to said retracted position.

2. The method of claim 1 wherein the step of disengaging said locking member from said retractable lock occurs coincident to the step of lifting said impression from said cavity.

3. The method of claim 1 wherein said retractable lock is affixed to a stripper and said step of lifting said impression from said cavity is accomplished by moving said stripper in said longitudinal direction relative to said cavity.

4. The method of claim 3 further comprising the step of moving said retractable lock from said second position and retracted position back to said first position and said unretracted position.

5. The method of claim 4 wherein said sheet of plastic material is in a continuous roll and each of steps is repeated a plurality of times to produce a plurality of containers.

6. A method of forming a male locking member on a thermoplastic container comprising the steps of:

heating a sheet of plastic material into a malleable physical state;

advancing said sheet over a cavity, defined by a mold, and retractable lock when said sheet is in said malleable physical state, said cavity defining a shape of said container and said retractable lock being adjacent to an outer edge of said mold, said retractable lock having an outward-facing surface including a male projection and an undercut, said retractable lock being movable in a transverse direction relative to said cavity between a retracted position and an unretracted position, said retractable lock being movable in a longitudinal direction relative to said cavity between a first position and a second position;

drawing said sheet into said cavity and around a top portion of said retractable lock when said sheet is in said malleable physical state and when said retractable lock is in said unretracted position and said first position;

cooling said sheet from said malleable physical state in to a hardened physical state, thereby forming an impression defining said container and said male locking member when said sheet is in said cavity and around said top portion of said retractable lock and when said retractable lock is in said unretracted position and said first position;

disengaging said male locking member from said retractable lock by moving said retractable lock inwardly toward said cavity from said unretracted position to said retracted position and moving said retractable lock in a longitudinal direction from said first position toward said second position.

7. A method of forming a male locking member on a thermoplastic container comprising the steps of:

heating a sheet of plastic material into a malleable physical state;

placing a retractable lock in an initial position adjacent to a cavity defining a shape of said container, said cavity being defined by a mold, said retractable lock having an inward-facing surface including a linear region and a control surface, said retractable lock having an outward-facing surface including a male projection and an undercut, said mold having an outer surface including a camming surface for frictionally engaging and applying outward pressure to said control surface, said camming surface maintaining said retractable lock adjacent to said mold when said retractable lock is in said initial position;

drawing said sheet into said cavity and around said retractable lock when said sheet is in said malleable physical state and when said retractable lock is in said initial position;

cooling said sheet from said malleable physical state in to a hardened physical state, when said retractable lock is in said initial position, thereby forming an impression defining said container and defining a male locking member facing outwardly and adjacent to an upper edge of said container; and moving said retractable lock upwardly from said initial position, said camming surface of said mold frictionally engaging said control surface and communicating transverse motion to said retractable lock in response to upward movement of said retractable lock, said retractable lock moving inwardly toward said cavity from said initial position toward a retracted position and becoming disengaged from said locking member in response to upward movement of said retractable lock, said retractable lock lifting said impression from said cavity in response to upward movement of said retractable lock.

8. A method of forming a male locking member on a thermoplastic container comprising the steps of:

heating a sheet of plastic material into a malleable physical state;

positioning a retractable lock in a first longitudinal position relative to a cavity defining a shape of said container, said cavity being defined by a mold, said retractable lock having an outward-facing surface including a male projection and an undercut defining a shape of said male locking member and an inward-facing surface including a linear region and a control surface, said mold including a camming surface for frictionally engaging and applying outward pressure to said control surface, said camming surface maintaining said retractable lock in an unretracted transverse position relative to said cavity when said retractable lock is in said first longitudinal position relative to said cavity, said linear region abutting against an outer surface of said mold with an uppermost portion of said linear region adjacent to an uppermost portion of said outer surface when said retractable lock is in said first longitudinal position and said unretracted transverse position relative to said cavity;

drawing said sheet of plastic material into said cavity and around said male projection and undercut of said retractable lock when said sheet is in said malleable physical state and when said retractable lock is in said first longitudinal position and said unretracted transverse position relative to said cavity;

cooling said sheet of plastic material from said malleable physical state into a hardened physical state when said retractable lock is in said first longitudinal position and said unretracted transverse position relative to said cavity, thereby forming an impression defining said container and defining a locking member facing outwardly and adjacent to an upper edge of said container; and moving said retractable lock upwardly from said first longitudinal position toward a second longitudinal position, said camming surface of said mold frictionally engaging said control surface and communicating transverse motion to said retractable lock in response to longitudinal movement of said retractable lock, said retractable lock moving inwardly toward said cavity from said unretracted transverse position toward a retracted transverse position in response to movement of said retractable lock from said first longitudinal position toward said second longitudinal position, said retractable lock engaging a lower surface of said impression and lifting said impression from said cavity in response to movement of said retractable lock from said first longitudinal position toward said second longitudinal position, said male projection and undercut of said retractable lock becoming disengaged from said locking member in response to movement of said retractable lock from said unretracted transverse position inwardly toward said cavity to said retracted transverse position.

* * * * *